United States Patent
Cason et al.

[11] Patent Number: 6,110,034
[45] Date of Patent: Aug. 29, 2000

[54] APPARATUS AND PROCESS FOR THE RAPID TENDERIZATION OF MEAT

[75] Inventors: John A. Cason, Athens; James A. Dickens; Clyde E. Lyon, both of Watkinsville, all of Ga.

[73] Assignee: The United States of America as represented by the Secretary of Agriculture, Washington, D.C.

[21] Appl. No.: 09/208,449

[22] Filed: Dec. 10, 1998

[51] Int. Cl.$^7$ .................................................. A22C 9/00
[52] U.S. Cl. ................................ 452/141; 452/144
[58] Field of Search ............................... 452/141, 144

[56] References Cited

U.S. PATENT DOCUMENTS

| | | | |
|---|---|---|---|
| 857,568 | 6/1907 | Hurley | 452/144 |
| 2,274,250 | 2/1942 | Simpkins | 452/144 |
| 2,396,020 | 3/1946 | Savage | 452/144 |
| 4,170,933 | 10/1979 | Meamber | 452/144 |

OTHER PUBLICATIONS

Herring et al., *J. Food Science*, vol. 30, pp. 1049–1054, 1965.
Whiting et al., *J. Food Science*, vol. 40, pp. 960–963, 1975.
Jungk et al., *J. Food Science*, vol. 35, pp. 143–145, 1970.
Sams et al., *Poultry Science*, vol. 69, pp. 348–353, 1990.
Birkhold et al., *Poultry Science*, vol. 71, pp. 2106–2112, 1992.
Khan, A. W., *J. Food Science*, vol. 39, pp. 393–395, 1974.
Wood, D.F., *J. Food Science*, vol. 39, pp. 526–529, 1974.
Locker, R. H., *Food Research*, vol. 25, pp. 304–307, 1960.
Jungk et al., *J. Food Science*, vol. 32, pp. 158–161, 1997.
Herring et al., *J. Food Science*, vol. 32, pp. 317–323, 1967.
Herring et al., *J. Science Food Agric.*, vol. 16, pp. 379–384, Jul. 1965.
Janky et al., *J. Poultry Science*, vol. 71, pp. 574–576, 1992.
Papa et al., *Poultry Science*, vol. 67, pp. 275–279, 1988.
Luyet et al., *J. Food Science*, vol. 35, pp. 577–581, 1970.
Wheeler et al., *J. Animal Science*, vol. 72, pp. 1232–1238, 1994.
Koohmaraie et al., *J. Animal Science*, vol. 74, pp. 2935–2942, 1996.
Thompson et al., *Poultry Science*, vol. 66, pp. 1158–1167, 1987.
Lyon et al., *J. Applied Poultry Res.*, vol. 1, pp. 300–304, 1992.

*Primary Examiner*—Willis Little
*Attorney, Agent, or Firm*—M. Howard Silverstein; John D. Fado; G. Byron Stover

[57] ABSTRACT

An apparatus and method for rapidly tenderizing meats such as poultry meats includes clamping the meat between plates to prevent contraction and toughening of the meat muscles and chilling, thereby alleviating long holding and refrigeration, as is the current practice. In an alternate embodiment, the apparatus may be automated to tenderize meat continuously.

9 Claims, 3 Drawing Sheets

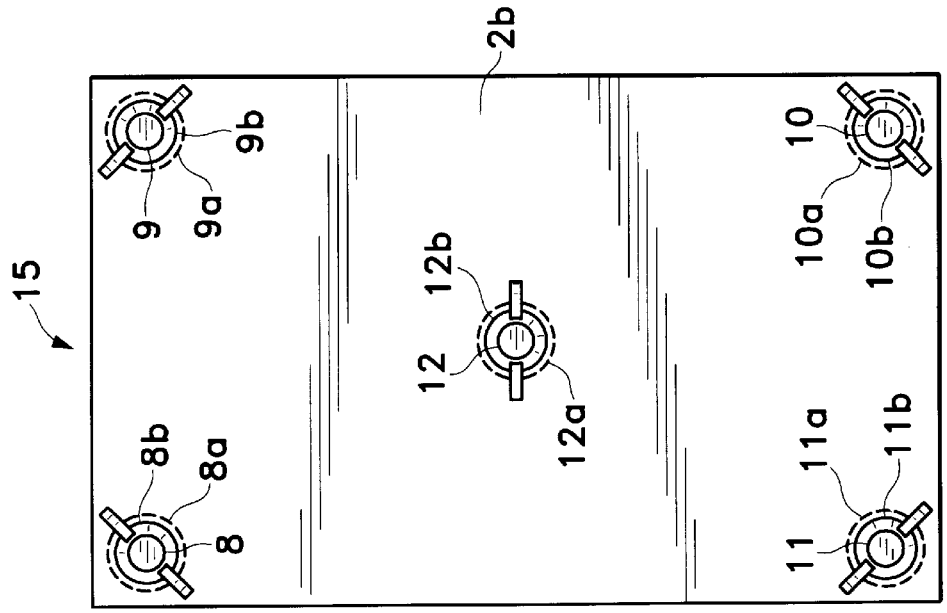
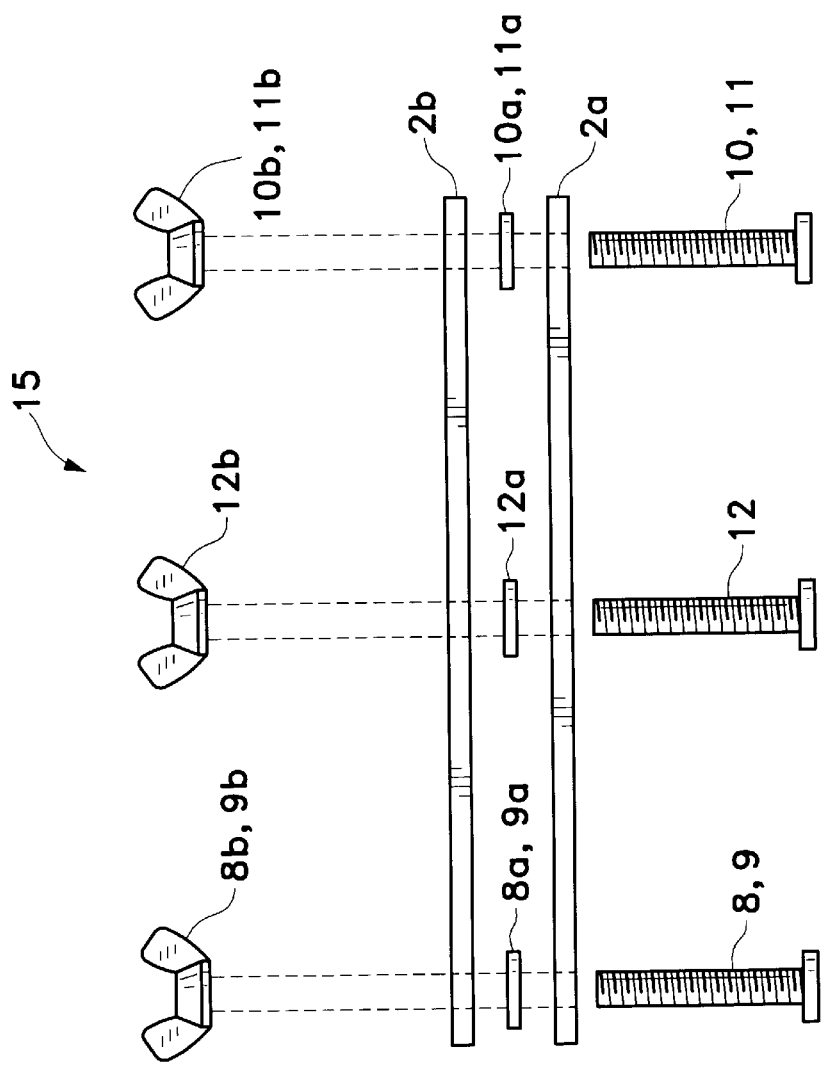
FIG. 2b
FIG. 2a

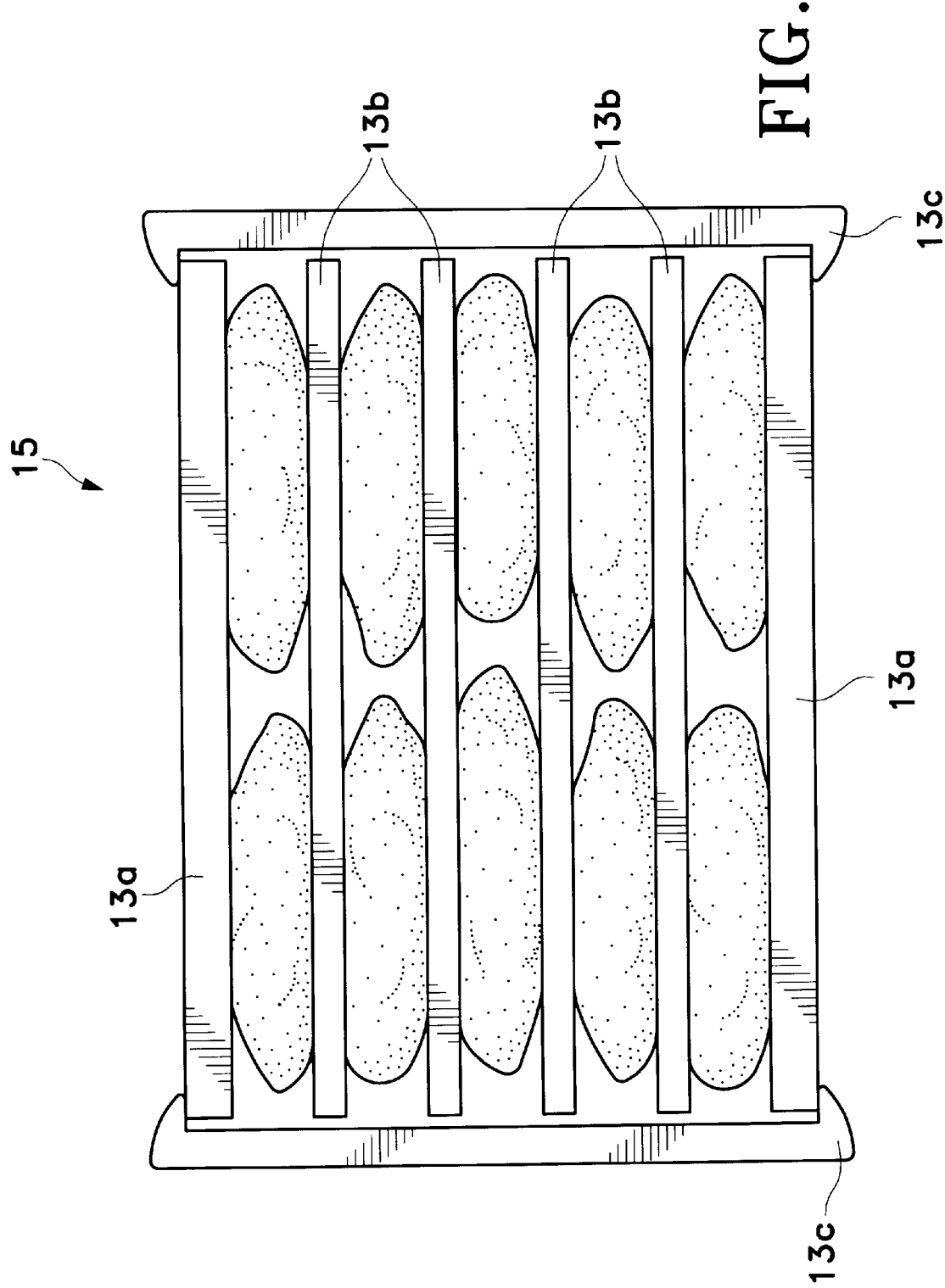

APPARATUS AND PROCESS FOR THE RAPID TENDERIZATION OF MEAT

BACKGROUND OF THE INVENTION

1. Field of the Invention

This invention relates to a system for rapid tenderization of meat, especially poultry breast meat. This system prevents muscle fibers from contracting and toughening during the process of rigor mortis. The invention also relates to apparatus and methods for rapid tenderization of meat.

2. Description of the Related Art

The poultry industry in the United States currently processes about 29 billion pounds of broilers per year, with a wholesale value of more than $15 billion. Due to consumer preference and use in fast food sandwiches, the pectoralis major muscles of the poultry breast, specifically chicken, are worth about half the value of the entire carcass. Current industry practice for deboned poultry breast muscles require a prolonged chilling process or further aging if they are to be sold as whole breast fillets. To avoid consumer complaints about tough breast meat, purchasers require as much as 6–8 hours of on-the-bone aging before deboning. Current practice increases production costs because of the increased handling, increased refrigerated storage space, greater overall space requirement, interruption of product flow, needless chilling of bones that will eventually be discarded and difficulties of labor scheduling caused by the time difference between slaughter and deboning.

Meat research in the 1960's revealed that muscles removed from beef carcasses before or during rigor mortis produced an irreversibly tougher, cooked meat. The toughness was caused by contractions of the muscles freed from the skeleton, which normally limits the extent to which muscles can contract (R. L. Locker, Food Research, Volume 25, 304 1960; H. K. Herring et al., Journal of Science of Food and Agriculture, Volume 16, 379 1965). Thus, when the muscles remained on the beef carcass, the meat was less tough, and when the muscles were subjected to some tension during aging the meat was more tender (H. K. Herring et al., J. of Food Science, Volume 30, 1049, 1965). Using gravity to provide the tension force, different methods of hanging the carcass during aging determined which muscles became tender. However, the effect of muscle tension on intact poultry carcasses was not shown until the late 1980s, when poultry wings were stretched to increase breast muscle tension and produce a more tender meat (C. M. Papa and D. L. Fletcher, Poultry Science, Volume 67, 1988). The hanging method of the 1960's and the stretching method are equivalent, as they prevent contraction of the muscle.

Research into the effects of tension on excised muscles focused on muscle strips which were clamped on the ends and then pulled. Changes in contraction and tenderness were studied in beef, rabbit, turkey and chicken (H. K. Herring et al., J. of Food Science, Volume 32, 317, 1976; R. A. Jungk et al., J. Food Science, Volume 32, 158, 1967; R. A. Jungk and W.W. Marion, J. of Food Science, Volume 35, 143, 1970; A. A. Klose et al., J. of Food Science, Volume 35, 577 1970; D. F. Wood and J. F. Richards, J. of Food Science, Volume 39, 525, 1974; R. C. Whiting and J. F. Richards, J. of Food Science, Volume 40, 960, 1975). Methods for applying tension included sewing or tieing muscle ends (A. W. Khan, J. of Food Science, Volume 39, 393, 1974; A. A. Dunn et al., British Poultry Science, Volume 34, 677 1993).

Two studies of ovine muscle used clamping of muscle followed by freezing of the clamped samples. In both studies, prerigor muscles were clamped between two plates prior to excising the meat from the carcass. After excision, the clamped muscle was immediately frozen at −30° C. with rapid air circulation on all sides. Muscle samples were removed from 15–336 hours post mortem. The carcass was stored at 1° C. before the removal of the remaining post mortem samples. After 90 minutes, frozen samples were removed, unclamped, and stored for 6–10 days at 4° C. or −5° C. Meat was then cooked from the frozen state and tested for shearing strength. The most tender meat was obtained with a 7–10 day aging process after unclamping (M. Koohmaraie et al., J. of Animal Science, Volume 74, 2935 1996; T. L. Wheeler and M. Koohmaraie, J. of Animal Science, Volume 72, 1232 1994).

The present invention is different from related art tenderization apparatus and methods and overcomes problems encountered by current processing methods, namely, producing a poultry breast meat which is tender and does not require additional aging and added production costs.

SUMMARY OF THE PRESENT INVENTION

It is therefore an object of the present invention to provide an apparatus for tenderizing meat, specifically poultry breast meat, which is not subjected to the usual aging process.

It is yet another object of the present invention to provide an apparatus which prevents the meat, especially poultry breast meat, from toughening and contracting during the process of rigor mortis.

Another object of the present invention is to provide a method of tenderizing meat, especially poultry breast meat, which is economical.

A still other object of the present invention is to provide a method of tenderizing meat, especially poultry breast meat, which avoids the problems of extended refrigeration.

It is yet another object of the present invention to provide a method of tenderizing meat, especially poultry breast meat, which can produce a varying degree of tenderness, depending upon the use of the meat.

Further objects and advantages of the invention will become apparent from the following description.

BRIEF DESCRIPTION OF THE FIGURES

FIG. 2a is a drawing of a side view of plates 2a and 2b aligned showing bolts 8–12, spacers 8a–12a and wingnuts 8b–12b.

FIG. 2b is a top view drawing of the aligned plates of FIG. 2a showing plate 2b with bolts 8–12, spacers 8a–12a, and wingnuts 8b–12b.

FIG. 3 is a drawing of a tenderization apparatus which maintains pressure on multiple breast meat fillets during chilling showing end plates 13a, interior plates 13b, and exterior clamping pieces 13c which maintain pressure on the end plates and on the meat contained in the apparatus.

DETAILED DESCRIPTION OF THE PREFERRED EMBODIMENTS

Figure 1:
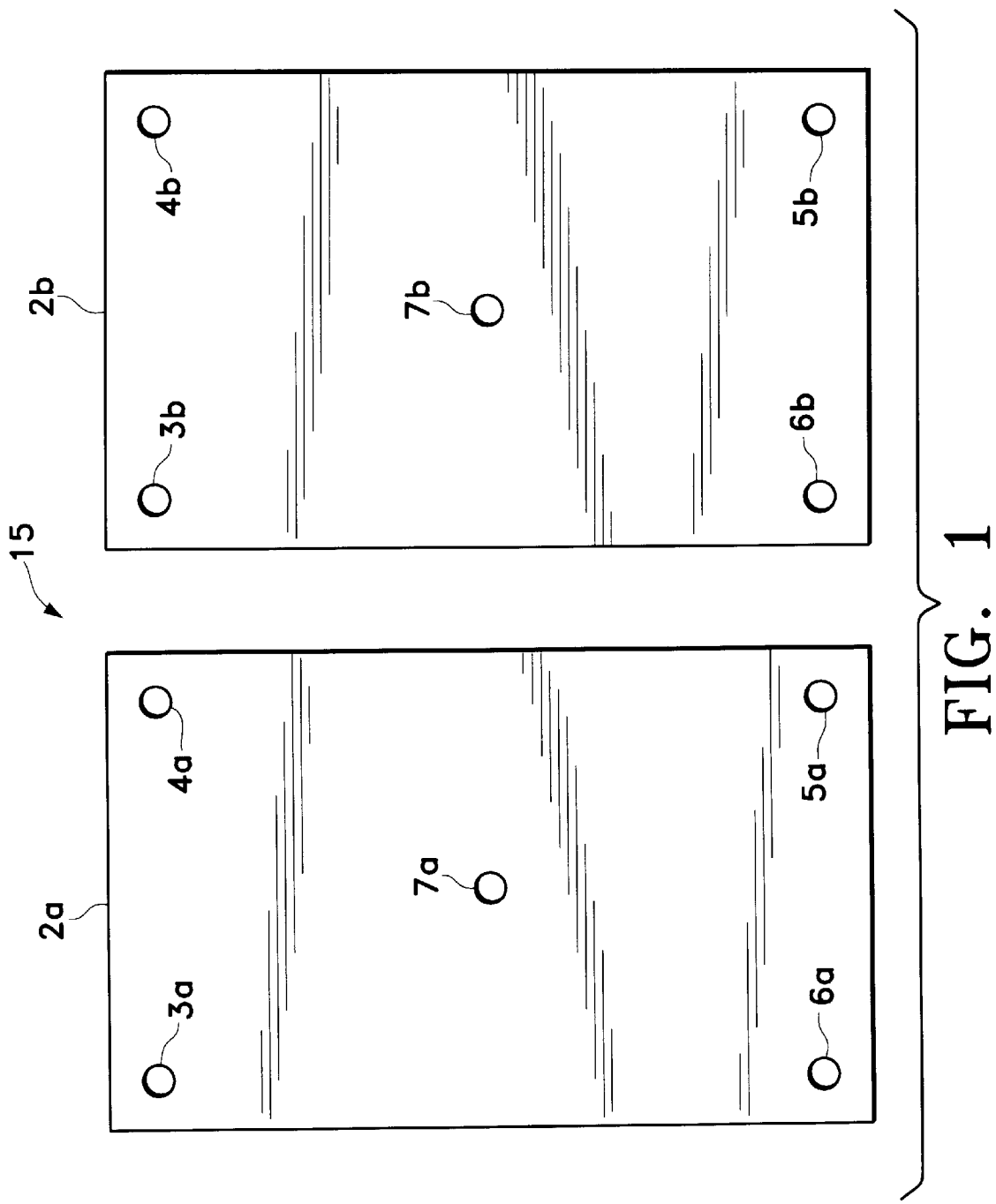
FIG. 1 is a drawing of a manual tenderization apparatus showing a top view of plates 2a and 2b with holes 3a,4a, 5a,6a and 7a; and 3b,4b,5b,6b, and 7b; respectively.

It has been shown that removal of large broiler breast muscles from skeletal restraints prior to the onset of rigor results in tough meat (Klose et al., Poultry Science, Volume 50, 585–591, 1971; Lyon et al., Poultry Science, Volume 64, 307–310, 1985; Lyon et al, Poultry Science, Volume 65, 907–914, 1986; and Papa et al., Poultry Science, Volume 68, 663–669, 1989). It has been reported that an aging period ranging from 4 to 24 hours is necessary to achieve tenderness in these large, complex muscles (Dodge et al., Food Technol., Volume 13, 81–84, 1959; and Dawson et al., Poultry Science, Volume 66, 1331–1333, 1987). The aging of the muscles, as deboned fillets is not as critical to meat tenderness as the actual time that the muscles are removed from skeletal restraints. The present invention provides a system for rapid tenderization of meat, especially poultry pectoralis major muscles, where the muscle is removed from the bone immediately after evisceration. Immediately after evisceration is defined as within about 10 to 15 minutes after evisceration. The system includes a clamping means 15 (FIGS. 1–3) and a chilling means.

Clamping means 15 can be any means capable of providing pressure to meat in order to flatten it. This prevents muscle fibers from contracting and toughening during the process of rigor mortis, changes which would otherwise be irreversible and result in tough, unacceptable meat of reduced economic value. Clamping means 15 can be two flat plates made of any material that is rigid or resistant to bending and is acceptable in direct contact with food, such as for example, metals such as for example stainless steel, aluminum, etc., or plastics. One of ordinary skill in the art could readily determine what material to use. The plates can be any size depending on the size of the muscle which is to be clamped (FIGS. 1, 2a, and 2b). For poultry pectoralis major muscles, the plates should allow at least approximately 12 square inches (approximately 77 square centimeters) per breast half removed from six-week old broilers. Muscle from older broilers will require a larger plate which one of ordinary skill in the art could readily determine from the above dimensions for six-week old broilers. In commercial application, the plates are large enough to apply pressure to 20 or more breast halves at a time. End plates would be thicker or stronger to allow even application of pressure to a stack of multiple interior plates (FIG. 3). Fastening means 8–12 can be anything which holds plates 2a and 2b together at the desired pressure to obtain tenderized meat. Pressure can be applied hydraulically followed by clamping, or by any method to maintain pressure during clamping of the meat. In manual operation using bolts, for example, as shown in FIGS. 1 and 2a–2b, Plate 2a include holes 3a, 4a, 5a, 6a and 7a and plate 2b contains holes 3b, 4b, 5b, 6b and 7b (FIG. 1). Holes 3a–6a and holes 3b–6b are generally positioned on a corner or on an area proximate the edge of each plate. Holes 7a and 7b are positioned centrally with respect to the face of each plate 2a and 2b, respectively. The corresponding a and b holes are aligned and fastening means 8–12 are placed therethrough (FIGS. 2a and 2b). Meat is placed on top of plate 2a and covered by plate 2b. Spacers 8a–12a are aligned over holes 3a–7a and plate 2b is placed over this. Once plate 2b is in place, holes 3a–7a are aligned with holes 3b–7b and fastening means 8–12 are positioned within the holes, removably affixing plate 2a to 2b. Wingnuts 8b–12b are placed on the bolts. Pressure is applied to the meat by rotating wingnuts 8b–12b so that approximately 5–20 kilograms of force is applied to the meat, or enough pressure to squeeze the breast pieces to about one half of the total thickness of the breast. The apparatus with meat is immediately subject to chilling at about 1° to 4° C. for approximately 30 minutes to 2 hours, depending on desired tenderness, with longer times associated with greater tenderness.

Chilling means 30 is any means which keeps the clamped meat chilled during the process. It can be an ice slush where temperature is maintained by adding more ice as it melts or the clamped meat can be air chilled.

In an alternate embodiment, the tenderization apparatus may be scaled up to size suitable for efficient industrial use. The apparatus includes a clamping means 15, shown in FIG. 3. Clamping means 15 comprises end plates 13a, interior plates 13b, and end pieces 13c to maintain a pressure of about 5 to 20 kilograms per breast during chilling. Breast meat is placed between adjacent pairs of plates in a stacked configuration after which pressure is applied hydraulically or by other means. The stack of plates is then secured with external end pieces or using an external rack in which the apparatus is placed to maintain the pressure during chilling to tenderize the meat. The meat is subjected to chilling during the time that it is clamped. Chilling may be implemented by placing the apparatus in a refrigerated room or in cold water. A force of about 5–20 kilograms is applied by pressing the plates together so that the plates are approximately 6–7 mm apart for tenderizing breast halves from six-week old broilers. Clamping means 15 can be further enlarged to contain more plates and more breast pieces between adjacent plates to allow for larger quantities of meat to be tenderized at a time.

In operation, muscle is removed from the bone immediately after evisceration of the carcasses, as defined above, and are flattened by clamping using the above described clamping means. A force of about 5–20 kilograms is applied by pressing the plates together so that the plates are approximately 6–7 mm apart for tenderizing breast halves from six-week-old broilers (This distance would be proportionally greater for larger breast meat pieces from older chickens) or so that the breast tissue is flattened to one-half its original thickness. The plates are then secured to maintain the force on the muscle. The apparatus containing the muscle is then chilled at about 1° to 4° C. for approximately 30 minutes to 2 hours. After the chilling period, the muscle is removed from between the plates. The meat is then packaged for sale as raw product or cooked immediately and then packaged for sale as cooked product. The process avoids the problem of refrigerating and holding processed carcasses for up to six to eight hours after slaughter before further processing. The degree of tenderness is directly proportional to the length of time that the meat is clamped and to the clamping force or distance between plates. This process prevents the muscle fibers in the meat from contracting and toughening during rigor mortis, where the resistance to contraction and rapid cooling of the meat exhaust energy supplies within the meat muscle and cause a faster completion of rigor.

The following examples illustrate the use of the invention for rapid tenderization of meat using the pectoralis major muscle of poultry as the test system. They are intended to further illustrate the invention and are not intended to limit the scope of the invention as defined by the claims.

EXAMPLE 1

Pectoralis muscles were deboned from a six-week-old broiler chicken carcass within 5 minutes of evisceration. Breast halves to be tenderized were clamped in pairs between aluminum plates measuring about 4 inches by 6 inches, and bolts holding the plates were tightened until the meat had been compressed to a thickness of approximately 7 mm. Control breast halves were placed in plastic bags that were perforated to allow passage of cold water. All breast pieces were then placed in an ice-water slush with a temperature of approximately 1° to 4° Celsius for about two hours. At that time all breast halves were removed from the ice slush and from the clamps and were sealed in plastic bags and placed in a refrigerated room. The following morning the breast halves were cooked for about 30 minutes in water at about 185 Fahrenheit. They were then cooled in a water bath for about 15 minutes after which breast meat slices were removed for testing to determine the amount of force necessary to shear standard pieces in a Warner-Bratzler shear press. Cooked breast meat which had been clamped required an average of about 2.7 kilograms of force to shear the meat, compared to about 11.4 kilograms of force (about four times greater than the tenderized meat) to shear pieces which were treated in an identical manner except for not being clamped during chilling. In ratings by human taste panels, about 2.7 kilograms is considered very tender and about 11.4 kilograms is considered moderately tough (Lyon and Lyon, supra, herein incorporated by reference). Meat requiring about 2.7 kilograms for shearing is still about 60% more tender than meat allowed to age on the carcass for about 24 hours.

EXAMPLE 2

In a second experiment, chicken pectoralis major muscles were prepared as described in example 1. In this study, clamping breast meat for 1 hour and cooking immediately gave a mean shear value of 5.1 kilograms ("slightly tender to moderately tender") versus 13.0 kilograms ("very tough") for meat treated in the same way except for clamping. Control breast meat held on the carcass for 24 hours before deboning and cooking sheared at 9.2 kilograms, or in the "slightly tough to slightly tender" range.

The results show that the muscle clamped for one hour and cooked immediately could be sheared with about 45% less force than breasts held on the carcass for 24 hours before cooking. The range of force applied by the clamping means was between about 5 and 20 kilograms per breast meat piece. As will be understood by one of skill in the art, the force may be changed, depending upon the thickness of the meat and the desired degree of tenderness. An important feature of the apparatus and process of this invention is that it does not require the usual extended holding and refrigeration of the meat between slaughter and further processing.

The foregoing detailed description is for the purpose of illustration. Such detail is solely for that purpose and those skilled in the art can make variations therein without departing from the spirit and scope of the invention.

What is claimed is:

1. An apparatus for tenderizing meats comprising a means for clamping multiple muscle pieces comprising at least two stacks of adjacent pairs of plates, each adjacent pair of plates serving as an upper and lower plate for applying pressure to pieces of said meat;

said upper and lower plates defining a portion wherein meat is placed, said upper and lower plates constructed so as to clamp said meat in said portion therebetween; and a means for chilling the clamped muscle pieces.

2. The apparatus of claim 1 wherein said apparatus is further constructed so as to exert a force between about 5 and 20 kilograms.

3. The apparatus of claim 1 wherein said means for chilling is a refrigerated room, and said apparatus is constructed to exert a force between about 5 and 20 kilograms.

4. A process for tenderizing meat comprising the steps of:

(a) removing meat from bone immediately after evisceration of carcass;

(b) placing said meat in the apparatus of claim 1;

(c) subjecting said meat and apparatus to chilling; and (d) retaining a clamping force using said apparatus to achieve a required degree of tenderness in said meat.

5. The process of claim 4 wherein said chilling step is at about 1° to about 4° C. for approximately 30 minutes to two hours.

6. The process of claim 5 further comprising exerting a force between about 5 and 20 kilograms using said clamping means.

7. The apparatus of claim 1, said apparatus further constructed to exert a force to said meat capable of reducing the thickness of said meat by about one-half.

8. The apparatus of claim 1 wherein said plates are flat.

9. The process of claim 4, wherein said clamping force reduces the thickness of said meat by about one-half using said clamping means.

* * * * *